United States Patent
Li et al.

(10) Patent No.: US 12,265,537 B2
(45) Date of Patent: Apr. 1, 2025

(54) JIT CODE COMPILATION DURING RUNTIME BASED ON RUNTIME STATISTICS

(71) Applicant: SAP SE, Walldorf (DE)

(72) Inventors: Cheng-Lun Li, Nussloch (DE); Till Merker, Sandhausen (DE); Manuel Mayr, Walldorf (DE); Paul Willems, Heidelberg (DE)

(73) Assignee: SAP SE, Walldorf (DE)

( * ) Notice: Subject to any disclaimer, the term of this patent is extended or adjusted under 35 U.S.C. 154(b) by 32 days.

(21) Appl. No.: 18/354,990

(22) Filed: Jul. 19, 2023

(65) Prior Publication Data

US 2025/0028719 A1 Jan. 23, 2025

(51) Int. Cl.
*G06F 16/2453* (2019.01)

(52) U.S. Cl.
CPC .............. *G06F 16/24542* (2019.01)

(58) Field of Classification Search
CPC ................................. G06F 16/24542
See application file for complete search history.

(56) References Cited

U.S. PATENT DOCUMENTS

| | | | | |
|---|---|---|---|---|
| 2014/0082597 A1* | 3/2014 | Chafi | ................. | G06F 8/4441 717/148 |
| 2015/0212838 A1* | 7/2015 | Pirvu | ................. | G06F 8/4441 717/148 |
| 2018/0089268 A1* | 3/2018 | Lee | ................. | G06F 16/254 |
| 2020/0311084 A1* | 10/2020 | Merker | ............ | G06F 16/24544 |
| 2021/0133193 A1* | 5/2021 | McConnell | ......... | G06F 16/2453 |
| 2023/0004563 A1* | 1/2023 | Zhang | ................. | G06F 8/4441 |
| 2023/0236907 A1* | 7/2023 | Gaburov | ................. | G06F 8/44 717/146 |
| 2024/0330029 A1* | 10/2024 | Gadd | ................. | G06F 9/45508 |

OTHER PUBLICATIONS

Ray Odaira et al., "Selective Optimization of Locks by Runtime Statistics and Just-in-time Compilation", IEEE, pp. 1-6 (Year: 2003).*

* cited by examiner

*Primary Examiner* — Jared M Bibbee
(74) *Attorney, Agent, or Firm* — Mintz Levin Cohn Ferris Glovsky and Popeo, P.C.

(57) ABSTRACT

Systems, methods, and articles of manufacture, including computer program products, provide a system including at least one data processor and at least one memory storing instructions which, when executed by the at least one data processor, cause operations comprising: generating, by a database execution engine, a query plan including a plurality of operators; inserting, by the database execution engine, an enforce compilation operator into the query plan that includes the plurality of operators, the plurality of operators comprising a first operator, the enforce compilation operator, and a second operator; executing at least the first operator of the query plan; in response to executing the first operator, evaluating, by the database execution engine, an output of the first operator to determine whether a condition is satisfied; and in response to the condition being satisfied, triggering, by the database execution engine, a just-in-time compilation of the second operator.

20 Claims, 7 Drawing Sheets

JIT CODE COMPILATION DURING RUNTIME BASED ON RUNTIME STATISTICS

TECHNICAL FIELD

The subject matter described herein relates generally to database processing and more specifically to database query optimization.

BACKGROUND

A database may be configured to store an organized collection of data. For example, data held in a relational database may be organized in accordance with a schema defining one or more relations, each of which being a set of tuples sharing one or more common attributes. The tuples of a relation may occupy the rows of a database table while the columns of the database table may store the values of the common attributes shared by the tuples. Moreover, one or more attributes may serve as keys that establish and identify relationships between the relations occupying different database tables. The database may support a variety of database operations for accessing the data stored in the database. For instance, the database may support transactional processing (e.g., on-line transactional processing (OLTP)) that modifies the data stored in the database. Alternatively and/or additionally, the database may support analytical processing (e.g., on-line analytical processing (OLAP)) that evaluates the data stored in the database.

SUMMARY

Systems, methods, and articles of manufacture, including computer program products, provide a system including at least one data processor and at least one memory storing instructions which, when executed by the at least one data processor, cause operations comprising: generating, by a database execution engine, a query plan including a plurality of operators; inserting, by the database execution engine, an enforce compilation operator into the query plan that includes the plurality of operators, the plurality of operators comprising a first operator, the enforce compilation operator, and a second operator; executing at least the first operator of the query plan; in response to executing the first operator, evaluating, by the database execution engine, an output of the first operator to determine whether a condition is satisfied; and in response to the condition being satisfied, triggering, by the database execution engine, a just-in-time compilation of the second operator.

In some variations, one or more features disclosed herein including one or more of the following features may be implemented as well. In response to the condition not being satisfied, the triggering of the second operator may be inhibited such that the second operator is not forced into the just-in-time compilation. The database execution engine may receive a query. In response to receiving the query, the query plan is generated. The enforce compilation operator may force the just-in-time compilation of the second operator into machine code. The first operator may include a first executable operator and the second operator may include a second executable operator. The database execution engine may insert the enforce compilation operator into the query plan to optimize execution of the query plan. The condition may be satisfied in response to a threshold value being exceeded. In response to the threshold value being exceeded, the database execution engine may trigger the just-in-time compilation of the second operator. In response to the threshold value not being exceeded, the database execution engine may inhibit the triggering of the second operator, such that the second operator is not forced into the just-in-time compilation but rather uses interpretive code for the second operator. The database execution engine may evaluate the output of the first operator to determine whether the condition is satisfied is in response to a first execution of the query plan and the first operator. The inserting may further include forking the output of the first operator to the enforce compilation operator and the second operator.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the allocation of worker threads to resume execution of a query execution plan, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

When a query plan is generated, a database execution engine may execute an operator of the query plan (also referred to as a "query execution plan") using an interpreter, for example. If the operator is used frequently (e.g., 2 or 3 more times during query plan execution), the database execution engine may decide to optimize the query plan by using a compiler (e.g., just-in-time (JIT) compiler) to generate machine code for the operator, which can speed execution of the operator but at the cost of the compilation time of the operator. There are certain operators that should be JIT compiled into a native machine program (even on a first execution) as the benefits of compilation exceed the costs. But the database execution engine does not have the actual information needed to decide whether an operator should be interpreted or JIT complied until runtime (e.g., when a prior operator generates an output that serves as an input to the operator being considered for JIT compilation). At runtime for example, an operator may have to process 1000 rows, but this 1000 row information is not known during query plan generation but rather the 1000 row information is not actually known until a prior, first operator executes and generates 1000 rows and pushes that output as an input to a second operator. In this example, the second operator might benefit from compilation as it would in this example speed up the processing of the data associated with the 1000 rows.

In some implementations, a query plan being executed includes an operator (referred to herein as "enforce JIT compile operator") that (1) collects data at runtime from an output of a first operator (e.g., an output of 1000 rows) and (2) triggers a second operator to be JIT compiled based on information about the first operator's output (e.g., the output includes a 1000 rows which exceeds a threshold value of rows).

Figure 1A:
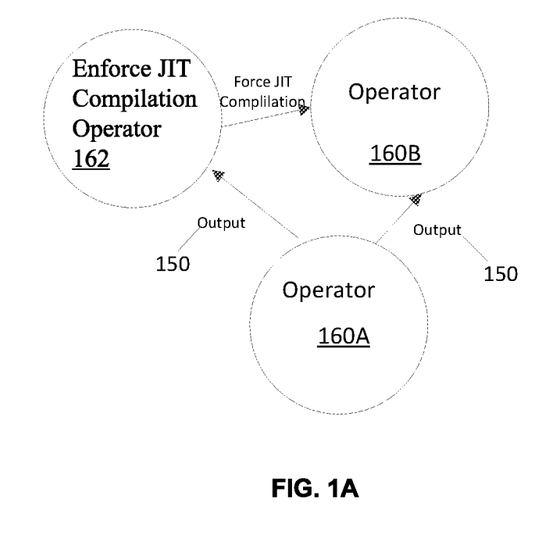
FIG. 1A depicts an example of a portion of a query plan including a first operator and a second operator, in accordance with some implementations.

FIG. 1A depicts an example of a portion of a query plan including a first operator 160A and a second operator 160B. The database execution engine generates a query execution plan that includes a plurality of operators including the first operator 160A and the second operator 160B. During query plan generation, the database execution engine does not have enough information to determine whether the second operator should be interpreted or complied (e.g., using a JIT compiler into machine code).

In accordance with some implementation, the database execution engine inserts into the query plan an enforce JIT compile operator 162. The database execution engine may include one or more rules to optimize the query plan by inserting the enforce JIT compile operator 162 in query plans where the intermediate results (e.g., quantity of results such as rows) may affect the query plan.

When the query plan represented by FIG. 1A is executed, the database execution engine executes the first operator 160A, which generates an output 150. The output 150 may be pushed to the enforce JIT compile operator 162 and the second operator 160B.

In some implementations, the enforce JIT compile operator 162 evaluates the output 150. For example, the enforce JIT compile operator 162 evaluates information such as parameters associated with the output 150. Examples of the evaluation parameters include a size of the output. For example, if the size of the output is 2000 rows, it may indicate that operator 160B may take 10 seconds to execute with an interpreted execution but may take 500 milliseconds if compiled and executed.

If the evaluated parameter exceeds a threshold value, the enforce JIT compile operator 162 triggers JIT compilation of the second operator 160B, which then executes using the pushed output 150. Referring to the previous example, if the 2000 row output 150 exceeds a threshold value of for example 500, the enforce JIT compile operator 162 forces (e.g., triggers) JIT compilation of the second operator (so the second operator is JIT compiled and the processes the output 150 pushed by the first operator 160A). In this way, a costly operator can be detected at run time and forced to be complied using for example a JIT compiler even on the operators first execution or call.

If however, the evaluated parameter does not exceed a threshold value, the enforce JIT compile operator 162 does not force JIT compilation of the second operator 160B, so the database execution can proceed with an interpretive code for the second operator 160B. Referring to the previous example, if the output 150 only contains 400 rows and the threshold value is 500 for example, the enforce JIT compile operator 162 does not force JIT compilation of the second operator 160B.

Figure 1B:
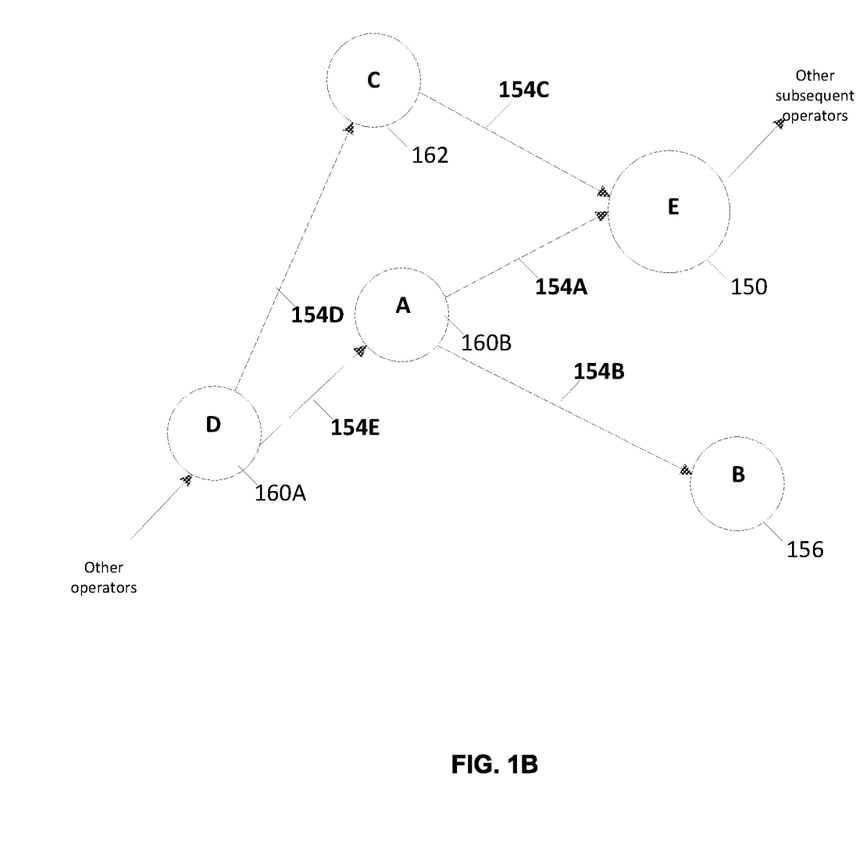
FIG. 1B illustrates an example of a portion of a directed acyclic graph, in accordance with some implementations.

FIG. 1B illustrates an example of a portion of a directed acyclic graph (DAG) which includes operators 162, 160A, 160B, as well as other operators 150 and 156, which are connected by links 154A, 154B, 154C, 154D, and 154E. The operators may be represented as a directed acyclic graph, and each operator may have one or more outgoing links (which in the case of pipelining are used to push chunks of data during execution) to one or more other operators. Likewise, each operator may have one or more incoming links (which provide data to the operator) from one or more other operators. Although some of the examples refer to the operators pushing data in so-called chunks, the data between operators may be exchanged in other ways as well.

Figure 1C:
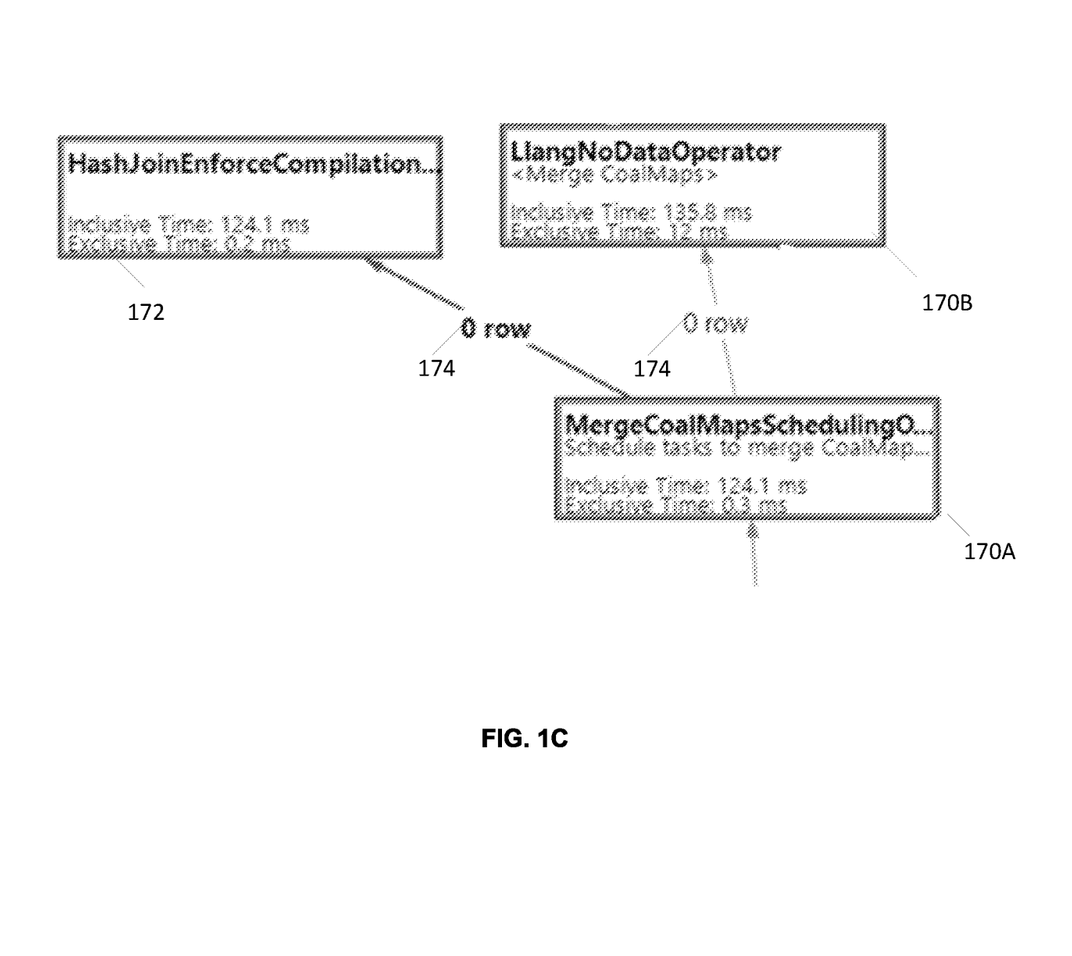
FIG. 1C depicts an example of a scheduling operator, a merger operator, and an enforce JIT compile operator, in accordance with some implementations.

FIG. 1C depicts another example including a scheduling operator 170A, a merger operator 170B, and an enforce JIT compile operator 172. In this example, the output 174 is provided in to the merger operator 170B and the enforce JIT compile operator 172. Based on the value of the output and it exceeding a threshold quantity of rows, the enforce JIT compile operator 172 forces JIT compilation of the second, merger operator 170B. The output 174 provided by scheduling operator may include one or more data chunk and/or other metrics, such as row count or distinct row count. As the execution time of merger operator grows with increasing input row size, the JIT compile operator 172 may only need the row count for example, and the JIT compile operator 172 can trigger the compilation of operator 170B based on the value (e.g., row count) and the predefined threshold.

Before providing additional description regarding forcing JIT compilation, the following provides description regarding an example database management system in which the forcing JIT compilation can be practiced.

Figure 2A:
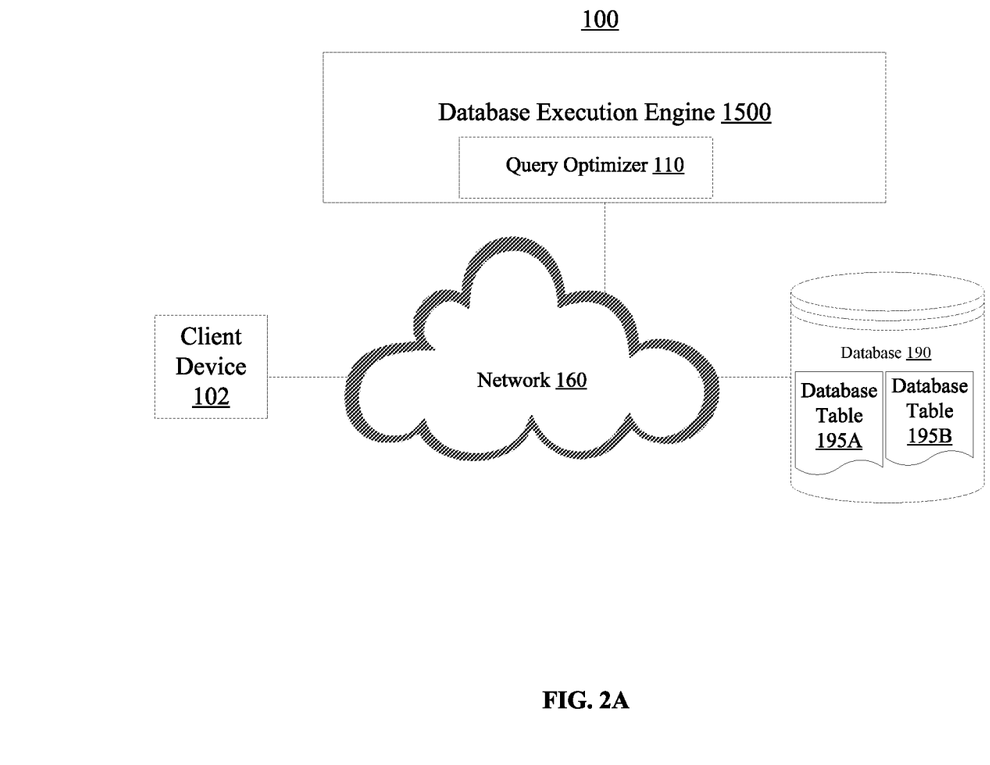
FIGS. 2A and 2B depict examples of systems including a database execution engine using an enforce JIT compile operator, in accordance with some example implementations.

FIG. 2A depicts a system diagram illustrating an example of a system 100, in accordance with some example implementations. Referring to FIG. 2A, the system 100 may include one or more client devices such as client device 102 (also referred to as client user equipment), a database execution engine 1500, and one or more databases, such as database 190. As shown in FIG. 2A, the one or more client devices 102, the database execution engine 1500, and the one or more databases 190 (which may include one or more database tables 195A-B) may be communicative coupled via a network 160. The database execution engine 1500 may be used to insert into the query plan an operator, such as the enforce JIT compile operator 162.

The one or more databases 190 may include a variety of relational database technologies including, for example, an in-memory database, a column-based database, a row-based database, hybrid database (e.g., combination of column and row based), and/or the like. The one or more client devices 102 may include processor-based devices including, for example, a mobile device, a wearable apparatus, a personal computer, a workstation, an Internet-of-Things (IoT) appliance, and/or the like. The network 160 may be a wired network and/or wireless network including, for example, a public land mobile network (PLMN), a local area network (LAN), a virtual local area network (VLAN), a wide area network (WAN), the Internet, and/or the like.

Figure 2B:
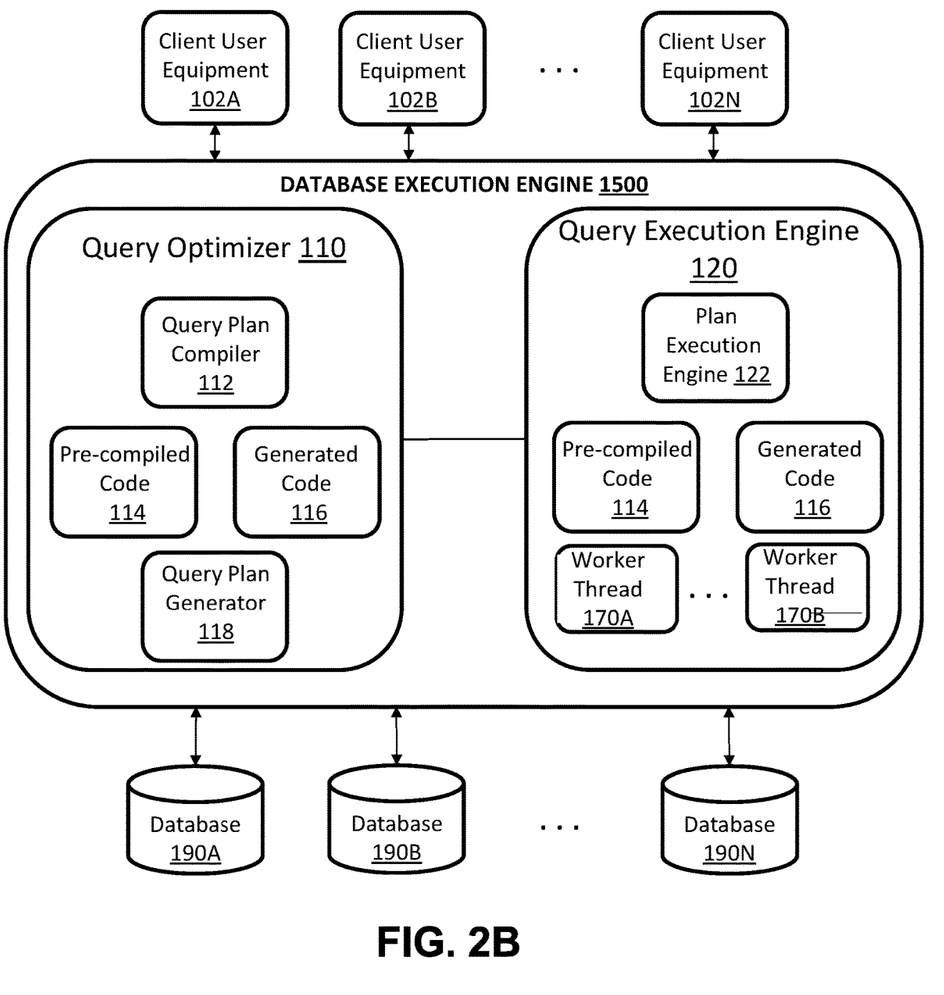

FIG. 2B depicts a block diagram illustrating an example implementation of the database execution engine 1500, in accordance with some example implementations. The database execution engine 1500 may include the query optimizer 110 that may be used to insert into the query plan an operator, such as the enforce JIT compile operator 162.

As shown in FIG. 2B, the one or more databases 190 (which may include a first database 190A, a second database 190B, and a third database 190C) may represent a database layer of a database management system (DBMS) where data may be persisted and/or stored in a structured way, and where the data may be queried or operated on using operations such as SQL commands or other types of commands/instructions to provide reads, writes, and/or perform other operations. To illustrate by way of an example, the one or more client devices 102 (which may include the client devices (e.g., client user equipment) 102A-N) may send a query via the database execution engine 1500 to the database layer including the one or more databases 190, which may represent a persistence and/or storage layer where database tables may be stored and/or queried. The query may be sent via a connection, such as a wired connection and/or wireless connection (e.g., the Internet, cellular links, Wi-Fi links, and/or the like) provided, for example, by the network 160.

The database execution engine 1500 may include a query optimizer 110, such as an SQL optimizer and/or another type of optimizer, to receive at least one query from the one or more client devices 102 and generate a corresponding query plan (which may be optimized) for execution by a query execution engine 120. The query optimizer 110 may receive a request, such as a query, and then form or propose an optimized query plan. The query plan (which may be optimized) may be represented as a so-called "query algebra" or "relational algebra" operators (e.g., relations) and may be in the form of a directed acyclic graph. The query plan may propose an optimum query plan with respect to, for example, the execution time of the overall query. To optimize a query, the query plan optimizer 110 may obtain one or more costs for the different ways the execution of the query plan may be performed, and the costs may be in terms of execution time at, for example, the one or more databases 190. The database execution engine 1500 may also insert into the query plan one or more operators, such as the enforce JIT compile operator 162.

A query plan compiler 112 may enable compilation of at least a portion of the query plan. The query plan compiler 112 may compile the optimized query algebra into operations, such as program code and/or any other type of command, operation, object, or instruction. This code may include pre-compiled code 114 (which may be pre-compiled and stored and then selected for certain operations in the query plan) and/or generated code 116 generated specifically for execution of the query plan. For example, the query plan compiler 112 may select pre-compiled code 114 for a given operation as part of the optimization of the query plan, while for another operation in the query plan the query plan compiler 112 may allow a compiler (e.g., a JIT compiler) to generate the code (i.e., generated code 116) into machine code or interpreted using an interpreter. The pre-compiled code 114 and the generated code 116 represent code for executing the query plan, and this code may be provided to a query plan generator 118, which interfaces with the query execution engine 120. Referring to the example of FIG. 1A, the enforce JIT compile operator 162 may force JIT compilation (e.g., by a JIT compiler) of the second operator 160B (forming generated code 116 such as machine language code native to the host machine). If however, the enforce JIT compile operator 162 chooses to not force the compilation, the second operator 160B might be interpreted at execution by the plan execution engine 122.

Moreover, the query optimizer 110 may optimize the query plan to enable pipelining during execution. The query execution engine 120 may receive, from the query plan generator 118, generated code to enable execution of the optimized query plan, although the query execution engine 120 may also receive code or other commands directly from a higher-level application or another source such as the one or more client devices 102. The generated code 116 may be provided to a plan execution engine 122 of the query execution engine 120. When the code for the query plan is ready for execution during runtime, the query execution engine 120 may step through the code, performing some of the operations within the database execution engine 1500 and sending some of the operations (or commands in support of an operation, such as a read, write, and/or the like) for execution at one or more of the one or more database 190A-N.

The query execution engine 120 may, as noted, be configured to handle different types of databases and the corresponding persistent layers and/or tables therein. For example, the one or more databases 190 may include at least one row-oriented database, in which case an insert is performed by adding a row with a corresponding row identifier. Alternatively and/or additionally, where the one or more databases 190A-N include one or more column store databases, which may use dictionaries and compressive techniques when inserting data into a table. Where the database layer includes multiple different types of databases, the query execution engine 120 may perform execution related to handling the differences between different types of databases such as row-oriented databases and column store databases. This may enable a reduction in processing at the database layer, for example, at each of the one or more databases 190A-N. Moreover, the query execution engine 120 may perform other operations including rule-based operations, such as joins and projections, as well as filtering, group by, multidimensional analysis, and/or the like to reduce the processing burden on the database layer. In this way, the query execution engine 120 may execute these and other complex operations, while the one or more databases 190A-N can perform simpler operations to reduce the processing burden at the one or more databases 190A-N.

The query execution engine 120 may run, as noted above, the generated code 116 generated for some query operations, while the pre-compiled code 114 may be run for other operations. Moreover, the query execution engine 120 may combine the generated code 116 with the pre-compiled code 114 to further optimize execution of query related operations. In addition, the query execution engine 120 may provide for a plan execution framework that is able to handle data chunk(s), pipelining, and state management during query execution. Furthermore, the query execution engine 120 may provide the ability to access table storage via an abstract interface to a table adapter, which may reduce dependencies on specific types of storage/persistence layers (which may enable use with different types of storage/persistence layers).

The database layer may provide distributed data storage in which the processing and storage of data is distributed across multiple nodes including, for example, the first database 190A, the second database 190B, the third database 190C, and/or the like. Accordingly, to store a database table 195A and/or 195B at the one or more databases 190, the database execution engine 1500 may divide the database table 195A and/or 195B into multiple partitions by applying one or more of a hash partitioning, round robin partitioning, and range partitioning.

Figure 3:
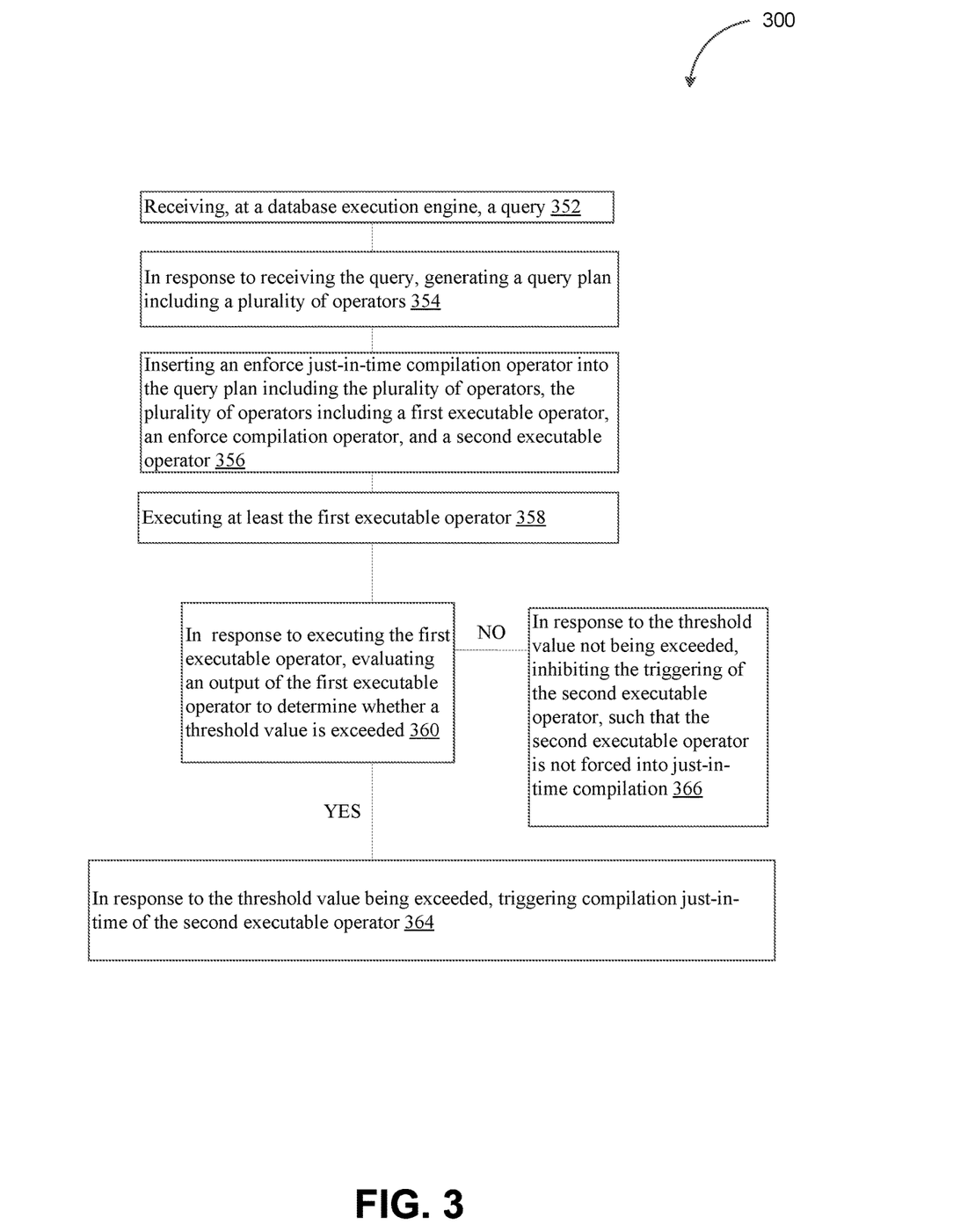
FIG. 3 depicts an example of a flow chart for using an enforce JIT compile operator to force compilation of an operator, in accordance with some example implementations.

FIG. 3 depicts a flowchart illustrating an example of a process 300 for deciding whether to force JIT compilation of am operation at runtime based on runtime statistics.

At 352, a query may be received at a database execution engine. For example, the database execution engine 1500 may receive a query from a client device, such as client user equipment 102A. For example, the query may be of the following form: SELECT*from T1 inner join T2 on T1.a=T2.a.

In response to receiving the query, the database execution engine may generate, at 354, a query plan including a plurality of operators. For example, the database execution engine may generate a query plan (also referred to as a query executing plan) including a plurality of operators, such as operators 160A, 160B, as well as other operators 150 and 156 and so forth as shown at the examples of FIGS. 1A-1C. These operators may be represented as a DAG. Alternatively, or additionally, these operators may be pipelined, in which case each operator outputs a chunk of data, rather than an intermediate or complete result set of the corresponding operation.

At 356, the database execution engine may insert an enforce JIT compilation operator into the query plan including the plurality of operators, which includes a first executable operator, the enforce compilation operator, and a second executable operator. For example, the database execution engine 1500 may insert the enforce JIT compilation operator 162 into the query plan as shown at the examples of FIGS. 1A-1C. For example, the database execution engine may optimize the query plan by inserting the enforce compilation operator. This insertion may be performed based on one or more rules that based on the query plan execution inserts the enforce compilation operator. Moreover, when the enforce JIT compilation operator 162 is inserted, the first operator 160A is modified to fork its output 150 to both the enforce JIT compilation operator 162 and the second operator 160B.

At 358, the database execution engine may execute at least the first operator, the enforce compilation operator, and a second operator. For example, the database execution engine 1500 may step through the query plan and execute each of the operators of the query plan as shown at the example of FIGS. 1A-1C. When the database execution engine 1500 executes operator 160A for example, the output 150 is received and evaluated by the enforce JIT compilation operator 162.

In response to executing the first operator, the database execution engine may at 360 evaluate an output of the first executable operator to determine whether a condition is satisfied. For example, the condition may be satisfied when a threshold value is exceeded. The enforce JIT compilation operator 162 may receive the output of the first operator 160B and/or may evaluate the output to determine whether the threshold value is exceeded. Referring to the earlier example above, the enforce JIT compilation operator 162 may determine if the output 150 exceeds a threshold quantity of rows.

In response to the condition being satisfied such as the threshold value being exceeded (yes at 360), the database execution engine may trigger, at 364, just-in-time compilation of the second executable operator. If the threshold value is exceeded, the enforce JIT compilation operator 162 triggers the compilation (e.g., JIT compile into machine code) of the second operator 160B. After the compilation, the database execution engine executes the compiled code and proceeds with the rest of the query plan execution of operators. Although this example uses quantity of rows to determine whether to trigger compilation of the second executable operator, other types of values may be used, such as a size of the output, size of operator 160B, complexity of operator 160B, sampled interpretation time of operator 160B, and/or the like.

In response to the threshold value not being exceeded (no at 360), the database execution engine may inhibit the triggering of the second executable operator, such that the second executable operator is not forced into just-in-time compilation. If the threshold value is not exceeded, the enforce JIT compilation operator 162 does not trigger the compilation (e.g., JIT compile) of the second operator 160B. As such, the database execution engine proceeds to execute the second operator (e.g., using an interpreter) and then proceeds with the rest of the query plan execution of operators.

Figure 4:
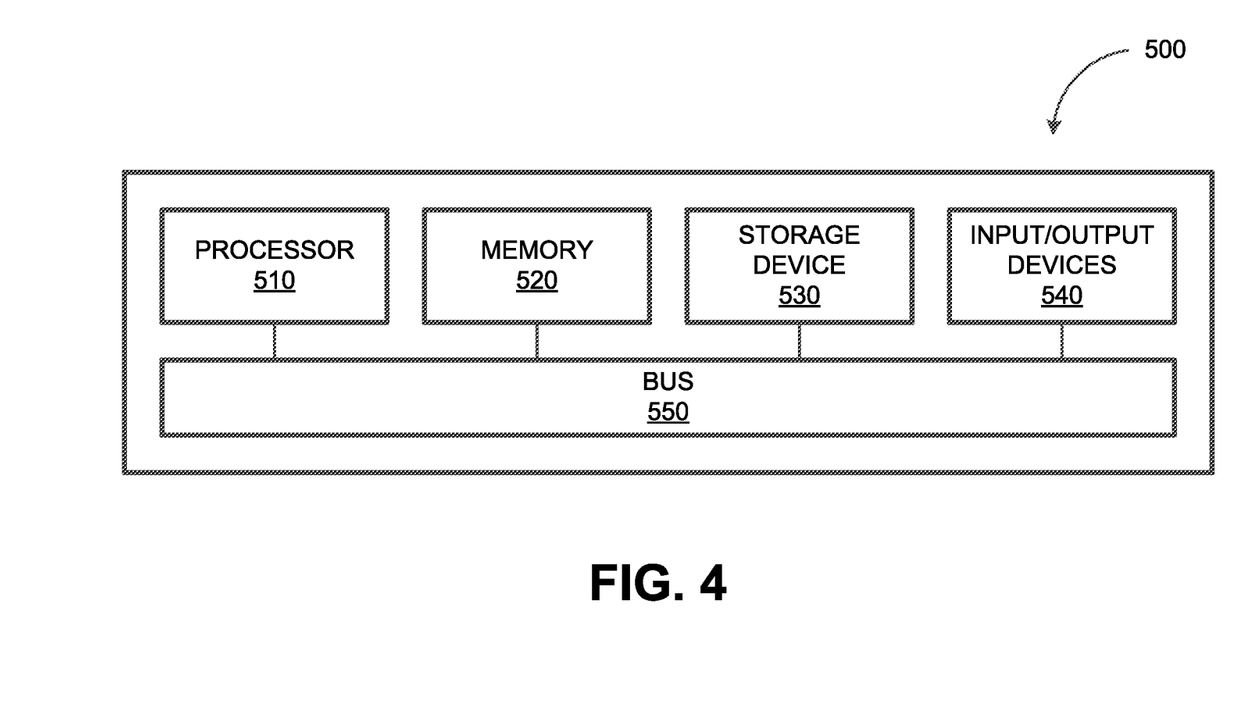
FIG. 4 depicts a block diagram illustrating an example of a computing system, in accordance with some example implementations.

FIG. 4 depicts a block diagram illustrating an example of a computing system 500 consistent with implementations of the current subject matter. Referring to FIGS. 1-3, the computing system 500 may implement the database execution engine 1500 and/or any components therein.

As shown in FIG. 4, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the database execution engine 1500. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising:
at least one data processor; and
at least one memory storing instructions which, when executed by the at least one data processor, cause operations comprising:

generating, by a database execution engine, a query plan including a plurality of operators;

inserting, by the database execution engine, an enforce compilation operator into the query plan that includes the plurality of operators, the plurality of operators comprising a first operator, the enforce compilation operator, and a second operator;

executing at least the first operator of the query plan;

in response to executing the first operator, evaluating, by the database execution engine, an output of the first operator to determine whether a condition is satisfied; and in response to the condition being satisfied, triggering, by the database execution engine, a just-in-time compilation of the second operator.

Example 2: The system of Example 1 further comprising;

in response to the condition not being satisfied, inhibiting the triggering of the second operator, such that the second operator is not forced into the just-in-time compilation.

Example 3: The system of any of Examples 1-2 further comprising:

receiving, at the database execution engine, a query.

Example 4: The system of any of Examples 1-3, wherein in response to receiving the query, the query plan is generated.

Example 5: The system of any of Examples 1-4, wherein the enforce compilation operator forces the just-in-time compilation of the second operator into machine code Example 6: The system of any of Examples 1-5, wherein the first operator comprises a first executable operator and the second operator comprises a second executable operator.

Example 7: The system of any of Examples 1-6, wherein the database execution engine inserts the enforce compilation operator into the query plan to optimize execution of the query plan.

Example 8: The system of any of Examples 1-7, wherein the condition is satisfied in response to a threshold value being exceeded.

Example 9: The system of any of Examples 1-8, wherein in response to the threshold value being exceeded, the database execution engine triggers the just-in-time compilation of the second operator.

Example 10: The system of any of Examples 1-9, wherein in response to the threshold value not being exceeded, the database execution engine inhibits the triggering of the second operator, such that the second operator is not forced into the just-in-time compilation but rather uses interpretive code for the second operator.

Example 11: The system of any of Examples 1-10, wherein the evaluating, by the database execution engine, the output of the first operator to determine whether the condition is satisfied is in response to a first execution of the query plan and the first operator.

Example 12: The system of any of Examples 1-11, wherein the inserting the enforce compilation operator further comprises forking the output of the first operator to the enforce compilation operator and the second operator.

Example 13: A method comprising:

generating, by a database execution engine, a query plan including a plurality of operators;

inserting, by the database execution engine, an enforce compilation operator into the query plan that includes the plurality of operators, the plurality of operators comprising a first operator, the enforce compilation operator, and a second operator;

executing at least the first operator of the query plan;

in response to executing the first operator, evaluating, by the database execution engine, an output of the first operator to determine whether a condition is satisfied; and in response to the condition being satisfied, triggering, by the database execution engine, a just-in-time compilation of the second operator.

Example 14: The method of Example 13 further comprising;

in response to the condition not being satisfied, inhibiting the triggering of the second operator, such that the second operator is not forced into the just-in-time compilation.

Example 15: The method of Examples 13-14 further comprising:

receiving, at the database execution engine, a query.

Example 16: The method of Examples 13-15, wherein in response to receiving the query, the query plan is generated.

Example 17: The method of Examples 13-16, wherein the enforce compilation operator forces the just-in-time compilation of the second operator into machine code Example 18: The method of Examples 13-17, wherein the first operator comprises a first executable operator and the second operator comprises a second executable operator.

Example 19: The method of Examples 13-18, wherein the database execution engine inserts the enforce compilation operator into the query plan to optimize execution of the query plan.

Example 20: A non-transitory computer-readable storage medium y storing instructions which, when executed by at least one data processor, cause operations comprising:

generating, by a database execution engine, a query plan including a plurality of operators;

inserting, by the database execution engine, an enforce compilation operator into the query plan that includes the plurality of operators, the plurality of operators comprising a first operator, the enforce compilation operator, and a second operator;

executing at least the first operator of the query plan;

in response to executing the first operator, evaluating, by the database execution engine, an output of the first operator to determine whether a condition is satisfied; and in response to the condition being satisfied, triggering, by the database execution engine, a just-in-time compilation of the second operator.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, cause operations comprising:
   generating, by a database execution engine, a query plan including a plurality of operators;
   inserting, by the database execution engine, an enforce compilation operator into the query plan that includes the plurality of operators, the plurality of operators comprising a first operator, the enforce compilation operator, and a second operator;
   executing at least the first operator of the query plan;
   in response to executing the first operator, evaluating, by the database execution engine, an output of the first operator to determine whether a condition is satisfied; and
   in response to the condition being satisfied, triggering, by the database execution engine, a just-in-time compilation of the second operator.

2. The system of claim 1, further comprising;
   in response to the condition not being satisfied, inhibiting the triggering of the second operator, such that the second operator is not forced into the just-in-time compilation.

3. The system of claim 1, further comprising:
   receiving, at the database execution engine, a query.

4. The system of claim 3, wherein in response to receiving the query, the query plan is generated.

5. The system of claim 1, wherein the enforce compilation operator forces the just-in-time compilation of the second operator into machine code.

6. The system of claim 1, wherein the first operator comprises a first executable operator and the second operator comprises a second executable operator.

7. The system of claim 1, wherein the database execution engine inserts the enforce compilation operator into the query plan to optimize execution of the query plan.

8. The system of claim 1, wherein the condition is satisfied in response to a threshold value being exceeded.

9. The system of claim 8, wherein in response to the threshold value being exceeded, the database execution engine triggers the just-in-time compilation of the second operator.

10. The system of claim 8, wherein in response to the threshold value not being exceeded, the database execution engine inhibits the triggering of the second operator, such that the second operator is not forced into the just-in-time compilation but rather uses interpretive code for the second operator.

11. The system of claim 1, wherein the evaluating, by the database execution engine, the output of the first operator to determine whether the condition is satisfied is in response to a first execution of the query plan and the first operator.

12. The system of claim 1, wherein the inserting the enforce compilation operator further comprises forking the output of the first operator to the enforce compilation operator and the second operator.

13. A method comprising:
    generating, by a database execution engine, a query plan including a plurality of operators;
    inserting, by the database execution engine, an enforce compilation operator into the query plan that includes the plurality of operators, the plurality of operators comprising a first operator, the enforce compilation operator, and a second operator;
    executing at least the first operator of the query plan;
    in response to executing the first operator, evaluating, by the database execution engine, an output of the first operator to determine whether a condition is satisfied; and
    in response to the condition being satisfied, triggering, by the database execution engine, a just-in-time compilation of the second operator.

14. The method of claim 13, further comprising;
    in response to the condition not being satisfied, inhibiting the triggering of the second operator, such that the second operator is not forced into the just-in-time compilation.

15. The method of claim 13, further comprising:
    receiving, at the database execution engine, a query.

16. The method of claim 15, wherein in response to receiving the query, the query plan is generated.

17. The method of claim 13, wherein the enforce compilation operator forces the just-in-time compilation of the second operator into machine code.

18. The method of claim 13, wherein the first operator comprises a first executable operator and the second operator comprises a second executable operator.

19. The method of claim 13, wherein the database execution engine inserts the enforce compilation operator into the query plan to optimize execution of the query plan.

20. A non-transitory computer-readable storage medium storing instructions which, when executed by at least one data processor, cause operations comprising:
    generating, by a database execution engine, a query plan including a plurality of operators;
    inserting, by the database execution engine, an enforce compilation operator into the query plan that includes the plurality of operators, the plurality of operators comprising a first operator, the enforce compilation operator, and a second operator;
    executing at least the first operator of the query plan;
    in response to executing the first operator, evaluating, by the database execution engine, an output of the first operator to determine whether a condition is satisfied; and
    in response to the condition being satisfied, triggering, by the database execution engine, a just-in-time compilation of the second operator.

* * * * *